US012812613B2

(12) United States Patent
Zhang et al.

(10) Patent No.: US 12,812,613 B2
(45) Date of Patent: Nov. 24, 2026

(54) NOMINAL AND SUBBAND PREAMBLE USAGE FOR EXTENDED RANGE

(71) Applicant: QUALCOMM Incorporated, San Diego, CA (US)

(72) Inventors: Yangjun Zhang, Shanghai (CN); Lin Yang, Shanghai (CN); Yusheng Yang, Shanghai (CN); Sandip Homchaudhuri, San Jose, CA (US); James Simon Cho, Stateline, NV (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 18/260,900

(22) PCT Filed: Mar. 12, 2021

(86) PCT No.: PCT/CN2021/080417
§ 371 (c)(1),
(2) Date: Jul. 10, 2023

(87) PCT Pub. No.: WO2022/188137
PCT Pub. Date: Sep. 15, 2022

(65) Prior Publication Data

US 2024/0080820 A1 Mar. 7, 2024

(51) Int. Cl.
*H04W 72/0453* (2023.01)
*H04W 72/20* (2023.01)
(Continued)

(52) U.S. Cl.
CPC ....... *H04W 72/0453* (2013.01); *H04W 72/20* (2023.01); *H04W 84/12* (2013.01); *H04W 88/12* (2013.01)

(58) Field of Classification Search
CPC . H04W 72/0453; H04W 72/20; H04W 84/12; H04W 88/12; H04W 74/0816;
(Continued)

(56) References Cited

U.S. PATENT DOCUMENTS 10,512,089 B2 * 12/2019 Lee .................... H04W 52/283
11,382,133 B2 * 7/2022 Thanayankizil ...... H04W 24/02
(Continued)

FOREIGN PATENT DOCUMENTS

AU 2015255257 A1 12/2015
CN 110139238 A 8/2019
(Continued)

OTHER PUBLICATIONS

International Search Report and Written Opinion—PCT/CN2021/080417—ISA/EPO—Dec. 1, 2021.
(Continued)

*Primary Examiner* — Brian T O Connor
(74) *Attorney, Agent, or Firm* — Harrity & Harrity LLP

(57) ABSTRACT

Various aspects of the present disclosure generally relate to wireless communication. In some aspects, a transmitter may detect at least one distance between the transmitter and a receiver. The transmitter may transmit, to the receiver, information using a selected band of a wide band or a narrow band, where the selected band is based at least in part on the at least one distance. Similarly, in some aspects, a receiver may detect at least one distance between the receiver and a transmitter. The receiver may receive, from the transmitter, information using a selected band of a wide band or a narrow band, where the selected band is based at least in part on the at least one distance. Numerous other aspects are described.

30 Claims, 9 Drawing Sheets

(51) Int. Cl.
*H04W 84/12* (2009.01)
*H04W 88/12* (2009.01)

(58) Field of Classification Search
CPC ..... H04W 52/325; H04W 52/28; H04W 4/23; H04W 4/80; H04W 76/14; H04W 88/06; H04L 5/0053; H04L 5/0069
See application file for complete search history.

(56) References Cited

U.S. PATENT DOCUMENTS

| | | | | |
|---|---|---|---|---|
| 11,528,650 | B2 * | 12/2022 | Agarwal | H04W 36/22 |
| 11,540,098 | B2 * | 12/2022 | Lee | G01S 13/84 |
| 11,635,512 | B2 * | 4/2023 | Sahara | G01S 13/931<br>342/70 |
| 11,733,344 | B2 * | 8/2023 | Suzaki | G01S 5/0218<br>455/456.1 |
| 12,095,525 | B2 * | 9/2024 | Lee | H02J 50/40 |
| 12,120,661 | B2 * | 10/2024 | He | H04W 72/0446 |
| 2008/0101332 | A1 | 5/2008 | Kim et al. | |
| 2015/0156617 | A1 | 6/2015 | Maguire | |
| 2016/0029248 | A1 | 1/2016 | Syed et al. | |
| 2017/0086193 | A1 | 3/2017 | Park et al. | |
| 2018/0049180 | A1 * | 2/2018 | Lee | H04W 52/242 |
| 2019/0208514 | A1 | 7/2019 | Pang et al. | |
| 2020/0359354 | A1 * | 11/2020 | Lee | H04W 64/006 |
| 2021/0033727 | A1 * | 2/2021 | Sahara | G01S 13/931 |
| 2022/0086854 | A1 * | 3/2022 | He | H04W 72/1215 |
| 2022/0150966 | A1 * | 5/2022 | Thanayankizil | H04W 24/02 |
| 2022/0279324 | A1 * | 9/2022 | Mourad | H04W 4/80 |
| 2023/0026790 | A1 * | 1/2023 | Gordaychik | H04W 72/23 |
| 2024/0406989 | A1 * | 12/2024 | Gordaychik | H04W 72/542 |
| 2024/0421857 | A1 * | 12/2024 | Lee | H02J 50/12 |
| 2026/0020013 | A1 * | 1/2026 | Viger | H04W 72/121 |

FOREIGN PATENT DOCUMENTS

| | | | |
|---|---|---|---|
| EP | 1261228 | A2 | 11/2002 |
| JP | 2014241535 | A | 12/2014 |
| WO | 2020093324 | A1 | 5/2020 |

OTHER PUBLICATIONS

Supplementary European Search Report—EP21929613—Search Authority—The Hague—Oct. 30, 2024.
Taiwan Search Report—TW111105185—TIPO—Dec. 22, 2025.

* cited by examiner

NOMINAL AND SUBBAND PREAMBLE USAGE FOR EXTENDED RANGE

CROSS-REFERENCE TO RELATED APPLICATION

This application is a 371 national stage application of PCT Application No. PCT/CN2021/080417 filed on Mar. 12, 2021, entitled "NOMINAL AND SUBBAND PREAMBLE USAGE FOR EXTENDED RANGE," which is hereby expressly incorporated by reference herein.

FIELD OF THE DISCLOSURE

Aspects of the present disclosure generally relate to wireless communication and to techniques and apparatuses for using wide band and narrow band communications with a mobile station.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a transmitter for wireless communication includes a memory and one or more processors operatively coupled to the memory, the memory and the one or more processors configured to detect at least one distance between the transmitter and a receiver; and transmit, to the receiver, information using a selected band of a wide band or a narrow band, wherein the selected band is based at least in part on the at least one distance.

In some aspects, a receiver for wireless communication includes a memory and one or more processors operatively coupled to the memory, the memory and the one or more processors configured to detect at least one distance between the receiver and a transmitter; and receive, from the transmitter, information using a selected band of a wide band or a narrow band, wherein the selected band is based at least in part on the at least one distance.

In some aspects, a method of wireless communication performed by a transmitter includes detecting at least one distance between the transmitter and a receiver; and transmitting, to the receiver, information using a selected band of a wide band or a narrow band, wherein the selected band is based at least in part on the at least one distance.

In some aspects, a method of wireless communication performed by a receiver includes detecting at least one distance between the receiver and a transmitter; and receiving, from the transmitter, information using a selected band of a wide band or a narrow band, wherein the selected band is based at least in part on the at least one distance.

In some aspects, a non-transitory computer-readable medium storing a set of instructions for wireless communication includes one or more instructions that, when executed by one or more processors of a transmitter, cause the transmitter to detect at least one distance between the transmitter and a receiver; and transmit, to the receiver, information using a selected band of a wide band or a narrow band, wherein the selected band is based at least in part on the at least one distance.

In some aspects, a non-transitory computer-readable medium storing a set of instructions for wireless communication includes one or more instructions that, when executed by one or more processors of a receiver, cause the receiver to detect at least one distance between the receiver and a transmitter; and receive, from the transmitter, information using a selected band of a wide band or a narrow band, wherein the selected band is based at least in part on the at least one distance.

In some aspects, an apparatus for wireless communication includes means for detecting at least one distance between the apparatus and a receiver; and means for transmitting, to the receiver, information using a selected band of a wide band or a narrow band, wherein the selected band is based at least in part on the at least one distance.

In some aspects, an apparatus for wireless communication includes means for detecting at least one distance between the apparatus and a transmitter; and means for receiving, from the transmitter, information using a selected band of a wide band or a narrow band, wherein the selected band is based at least in part on the at least one distance.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
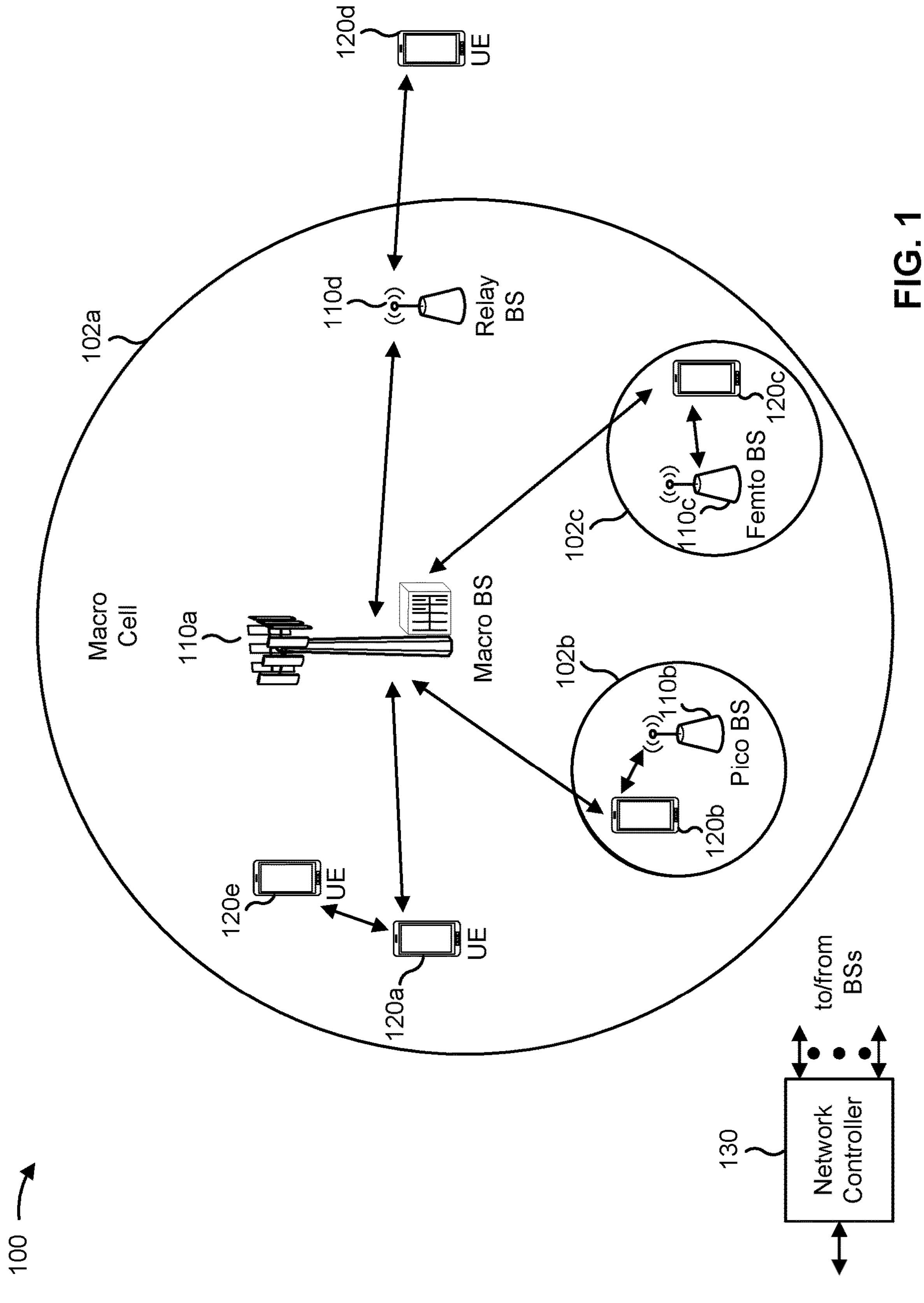
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
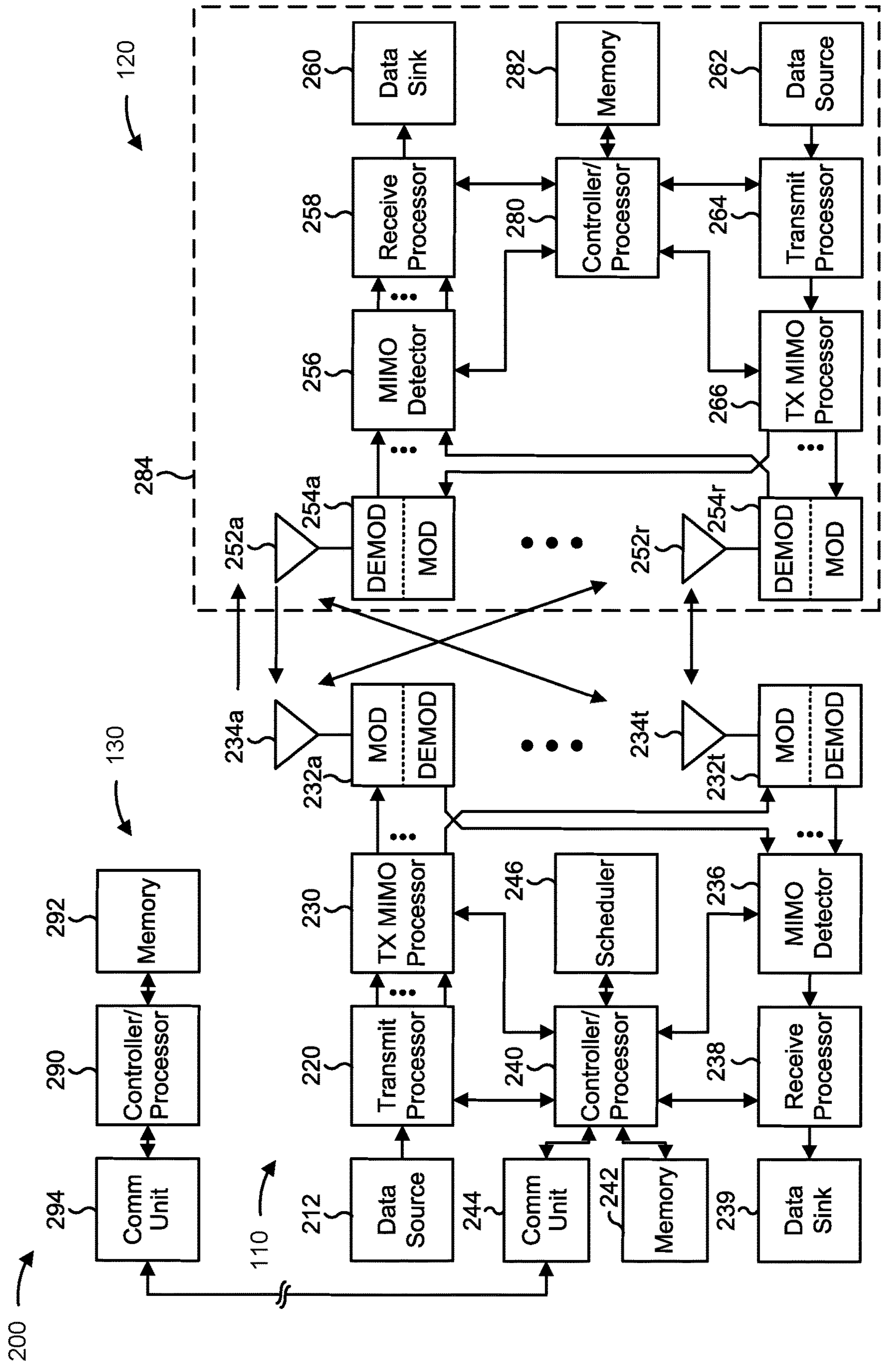
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with using wide band and narrow band communications with a mobile station, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples. In some aspects, the transmitter described herein is the base station 110, is included in the base station 110, includes one or more components of the base station 110 shown in FIG. 2, is included in the UE 120, or includes one or more components of the UE 120 shown in FIG. 2. In some aspects, the receiver described herein is the base station 110, is included in the base station 110, includes one or more components of the base station 110 shown in FIG. 2, is included in the UE 120, or includes one or more components of the UE 120 shown in FIG. 2.

In some aspects, a transmitter (e.g., the UE 120, apparatus 800 of FIG. 8, the base station 110, and/or apparatus 900 of FIG. 9) may include means for detecting at least one distance between the transmitter and a receiver (e.g., the UE 120, apparatus 800 of FIG. 8, the base station 110, and/or apparatus 900 of FIG. 9); and/or means for transmitting, to the receiver, information using a selected band of a wide band or a narrow band, wherein the selected band is based at least in part on the at least one distance. In some aspects, the means for the transmitter to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the transmitter to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the transmitter may further include means for transmitting, on the wide band, a clear to send signal; means for transmitting, on the narrow band, a request to send signal; and/or means for receiving, on the narrow band and based at least in part on transmitting the request to send signal, a clear to send signal. In some aspects, the transmitter may further include means for receiving, on the narrow band and based at least in part on transmitting the information, an acknowledgment signal. In some aspects, the, from the receiver, the at least one frame indicating the selected band transmitter may further include means for transmitting, to the receiver, at least one frame indicating the selected band; and/or means for receiving In some aspects, a receiver (e.g., the UE 120, apparatus 800 of FIG. 8, the base station 110, and/or apparatus 900 of FIG. 9) may include means for detecting at least one distance between the receiver and a transmitter (e.g., the UE 120, apparatus 800 of FIG. 8, the base station 110, and/or apparatus 900 of FIG. 9); and/or means for receiving, from the transmitter, information using a selected band of a wide band or a narrow band, wherein the selected band is based at least in part on the at least one distance. In some aspects, the means for the receiver to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. As an alternative, the means for the receiver to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the receiver may further include means for receiving, on the narrow band, a request to send signal; means for transmitting, on the narrow band and based at least in part on receiving the request to send signal, a clear to send signal; and/or means for transmitting, on the wide band, a clear to send signal. In some aspects, the receiver may further include means for transmitting, on the narrow band and based at least in part on receiving the information, an acknowledgment signal. In some aspects, the receiver may further include means for transmitting, to the transmitter, at least one frame indicating the selected band; or means for receiving, from the transmitter, the at least one frame indicating the selected band.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Many mobile stations, such as drones or UEs, communicate with a controller, such as a base station or a network node, using a narrow band (e.g., associated with a bandwidth of less than 20 MHz) signal. For example, the mobile stations may communication with the controller on the narrow band according to wireless local area network (WLAN) standards, such as the Institute of Electrical and Electronics Engineers (IEEE) Local Area Network/Metropolitan Area Network (LAN/MAN) Standards Committee's 802.11 standards (also referred to as "IEEE 802.11 protocols"). By communicating on the narrow band, the mobile stations may communicate with the controller across longer distances, such as several kilometers. However, using a narrow band signal reduces throughout as compared with using a wide band (e.g., associated with a bandwidth equal to or greater than 20 MHz) signal.

Some techniques and apparatuses described herein enable a transmitter (e.g., transmitter 405 depicted in FIGS. 4 and 5) to send information to a receiver (e.g., receiver 410 depicted in FIGS. 4 and 5) using a selected band of either a wide band or a narrow band. As a result, the transmitter and the receiver may communicate across longer distances (e.g., by communicating on the narrow band) but also increase throughput across shorter distances (e.g., by communicating on the wide band). Additionally, in some aspects, the transmitter and the receiver may transmit signals on both the wide band and the narrow band before communicating. As a result, the transmitter and the receiver may avoid collisions that would occur when preambles for wide band communications are not decodable by devices using the narrow band and/or when preamble for narrow band communications are not decodable by devices using the wide band (e.g., as preambles according to the IEEE 802.11 protocols are not). For example, the transmitter and the receiver may perform carrier-sense multiple access with collision avoidance (CSMA/CA), which increases quality and/or reliability of communications.

Figure 3:
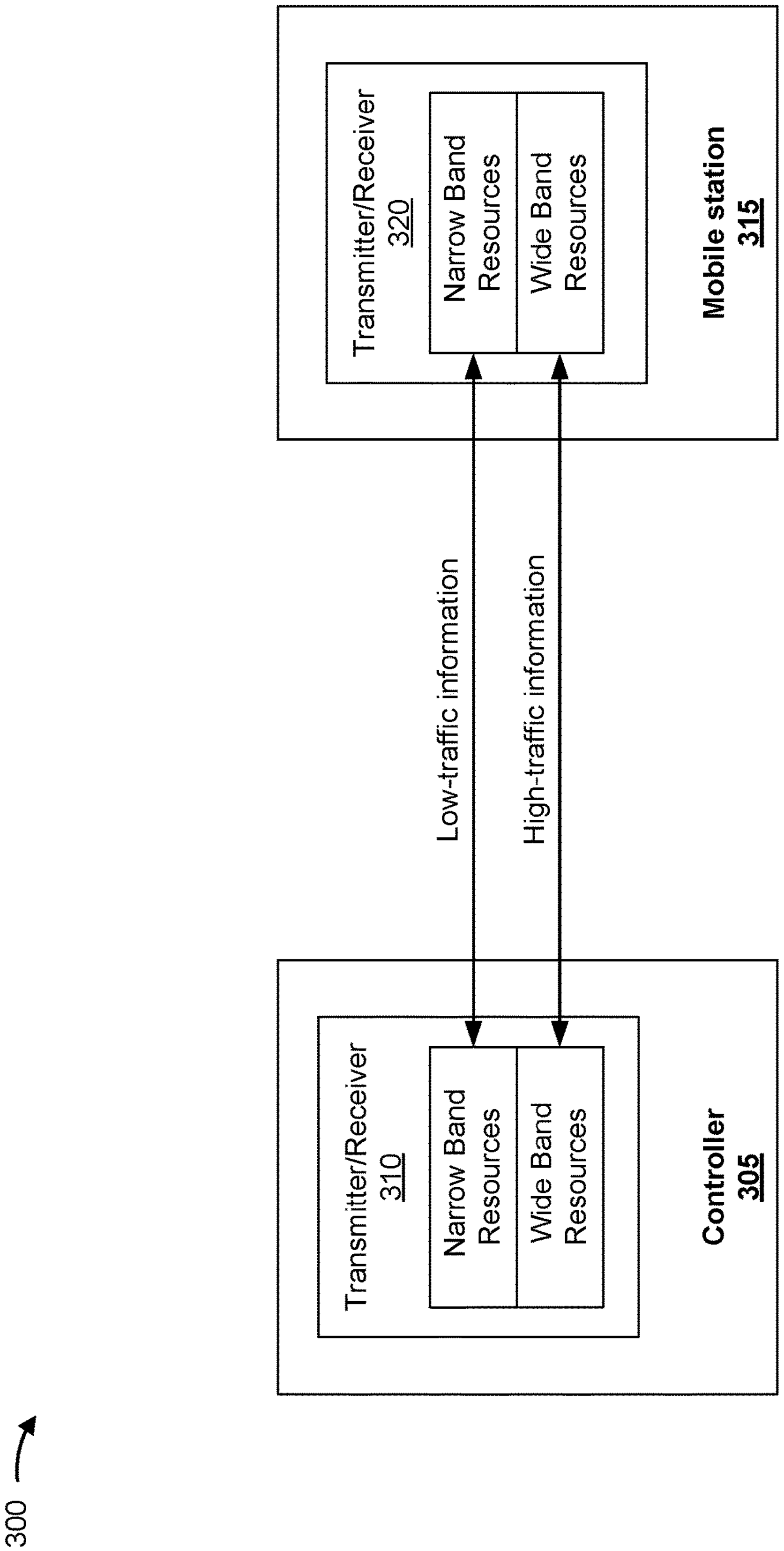
FIGS. 3, 4, and 5 are diagrams illustrating examples associated with using wide band and narrow band communications with a mobile station, in accordance with the present disclosure.

FIG. 3 is a diagram illustrating an example 300 associated with using wide band and narrow band communications with a mobile station, in accordance with the present disclosure. As shown in FIG. 3, example 300 includes a controller 305 that includes a transmitter/receiver device 310. Although described below using the controller 305, the description similarly applies to a base station (e.g., base station 110) an independent basic service set (IBSS) node, a peer-to-peer (P2P) node, a neighbor aware network (NAN) node, an access point (AP) in a WLAN, a station (STA) in WLAN, and/or another stationary or lower-mobility device. Additionally, example 300 includes a mobile station 315 that includes a transmitter/receiver device 320. Although described below using the mobile station 315, the description similarly applies to a UE (e.g., UE 120), an MSS node, a P2P node, a NAN node, an AP in a WLAN, a STA in a WLAN, and/or another higher-mobility device. In some aspects, the controller 305 and the mobile station 315 may communicate wirelessly (e.g., according to WLAN standards, such as the IEEE 802.11 protocols).

In some aspects, the controller 305 and/or the mobile station 315 may detect at least one distance between the controller 305 and the mobile station 315. In some aspects, the at least one distance may include a physical distance between the controller 305 and the mobile station 315. For example, the controller 305 and/or the mobile station 315 may estimate a straight-line (e.g., Euclidean) distance between the controller 305 and the mobile station 315, a geodesic distance between the controller 305 and the mobile station 315, a two-dimensional distance (e.g., a distance between normal vectors from a surface of Earth towards the controller 305 and the mobile station 315 and a difference between altitudes of the controller 305 and the mobile station 315), and/or another physical distance between the controller 305 and the mobile station 315. In some aspects, the controller 305 and the mobile station 315 may exchange signals such that the controller 305 and/or the mobile station 315 may use mobility management techniques to estimate the at least one distance.

Additionally, or alternatively, the at least one distance may include a signal distance between the controller 305 and the mobile station 315. For example, the controller 305 may determine the at least one distance as a difference between a measurement of a signal originating at the mobile station 315 and a measurement of a corresponding reference signal. For example, the controller 305 may estimate an RSRP, an RSSI, a signal-to-noise ratio (SNR), a signal-to-interference-and-noise ratio (SINR), and/or another signal distance associated with the mobile station 315. Similarly, the mobile station 315 may determine the at least one distance as a difference between a measurement of a signal originating at the controller 305 and a measurement of a reference signal. For example, the mobile station 315 may estimate an RSRP, an RSSI, an SNR, an SINR, and/or another signal distance associated with the controller 305.

Additionally, the controller 305 may transmit, and the mobile station 315 may receive, information using a selected band of a wide band (e.g., associated with a bandwidth equal to or greater than 20 MHz) or a narrow band (e.g., associated with a bandwidth less than 20 MHz). Additionally, or alternatively, the mobile station 315 may transmit, and the controller 305 may receive, information using the selected band. In some aspects, the narrow band may include at least one frequency that is included in the wide band. As an alternative, the narrow band and the wide band may not overlap in a frequency domain.

As shown in FIG. 3, the controller 305 and/or the mobile station 315 may select the band to use based at least in part on a type of traffic. For example, the transmitter/receiver device 310 of the controller 305 and the transmitter/receiver device 320 of the mobile station 315 may use narrow band resources to exchange low-traffic information, such as control data (e.g., an instruction from the controller 305 that directs the mobile station 315 to move or otherwise act according to the instruction and/or an indication from the mobile station 315 associated with the mobile station 315 moving or otherwise performing an action), event information (e.g., an indication from the mobile station 315 that one or more measurements from one or more sensors of the mobile station 315 satisfy at least one criterion and/or an indication from the controller 305 that an event is triggered by a system clock or other variable satisfying at least one criterion), status information (e.g., an indication from the mobile station 315 of a battery level, altitude, and/or other property associated with the mobile station 315 and/or an indication from the controller 305 of a system clock or other property associated with the controller 305), or text information. As an alternative, the transmitter/receiver device 310 of the controller 305 and the transmitter/receiver device 320 of the mobile station 315 may use wide band resources to exchange high-traffic information, such as a video stream or a large file (e.g., larger than 1 megabyte).

Additionally, or alternatively, the controller 305 and/or the mobile station 315 may select the band to use based at least in part on the at least one distance, as described above. For example, the transmitter/receiver device 310 of the controller 305 and the transmitter/receiver device 320 of the mobile station 315 may use wide band resources when the at least one distance satisfies a threshold (e.g., 10 meters, 100 meters, 1 kilometer, and so on, when the distance is a physical distance, or –30 dB, –35 dB, –40 dB, and so on, when the distance is a signal distance). As an alternative, the transmitter/receiver device 310 of the controller 305 and the transmitter/receiver device 320 of the mobile station 315 may use narrow band resources when the at least one distance does not satisfy the threshold. In some aspects, the controller 305 and/or the mobile station 315 may use one or more additional factors to select the band. For example, the controller 305 and/or the mobile station 315 may select the band based at least in part on a transmitting packet retry rate, a transmitting packet failure rate, a receiving duplicated packet rate, and/or a receiving packet failure rate (e.g., such that the narrow band is selected when the rate is higher, and the wide band is selected when the rate is lower). Additionally, or alternatively, the controller 305 and/or the mobile station 315 may select the band based at least in part on one or more channel quality metrics, such as radio measurements according to IEEE 802.11h protocols and/or IEEE 802.11k protocols, CSMA/CA parameters (e.g., average contention window size and/or average time out), and/or channel interference estimates. In some aspects, the controller 305 and the mobile station 315 may transmit the information as described below in connection with FIG. 4 and/or FIG. 5.

Accordingly, the controller 305 and the mobile station 315 may transition from using wide band resources to using narrow band resources as the at least one distance increases. Similarly, the controller 305 and the mobile station 315 may transition from using narrow band resources to using wide band resources as the at least one distance decreases. In some aspects, the controller 305 may use a same medium access control (MAC) address and/or a same Internet protocol (IP) address on the wide band and on the narrow band. Similarly, the mobile station 315 may use a same MAC address and/or a same IP address on the wide band and on the narrow band. Accordingly, transitions between the wide band and the narrow band may be transparent to a stack associated with a transmission control protocol and an IP (also referred to as a "TCP/IP stack").

In some aspects, the controller 305 and the mobile station 315 may exchange at least one frame indicating the selected band. For example, the controller 305 may transmit, and the mobile station 315 may receive, at least one frame indicating the selected band. Additionally, or alternatively, the mobile station 315 may transmit, and the controller 305 may receive, at least one frame indicating the selected band. The at least one frame may be transmitted using both the wide band resources and the narrow band resources. In some aspects, the controller 305 and the mobile station 315 may default to the wide band. Accordingly, the controller 305 and/or the mobile station 315 may only transmit at least one frame indicating a change to the narrow band (e.g., based at least in part on the at least one distance as described above). As an alternative, the controller 305 and the mobile station 315 may default to the narrow band. Accordingly, the controller 305 and/or the mobile station 315 may only transmit at least one frame indicating a change to the wide band (e.g., based at least in part on the at least one distance as described above).

In some aspects, the controller 305 may transmit, and the mobile station 315 may receive, a beacon, either periodically, on an on-demand basis, or a combination thereof. Additionally, or alternatively, the mobile station 315 may transmit, and the controller 305 may receive, a beacon, either periodically, on an on-demand basis, or a combination thereof. The controller 305 and/or the mobile station 315 may use the beacon(s) to synchronize system clocks and/or estimate mobility of the mobile station 315. In some aspects, the beacon(s) may be transmitted using the narrow band resources, the wide band resources, or a combination thereof. For example, the beacon(s) may be transmitted on both the narrow band and the wide band when the at least one distance satisfies a threshold (e.g., as described above) but may be transmitted only on the narrow band when the at least one distance does not satisfy the threshold.

By using techniques as described in connection with FIG. 3, the transmitter/receiver devices 310 and 320 may communicate using a selected band of either a wide band or a narrow band. As a result, the transmitter/receiver devices 310 and 320 may communicate across longer distances (e.g., by communicating on the narrow band) but also increase throughput across shorter distances (e.g., by communicating on the wide band). Additionally, in some aspects, and as described below in connection with FIG. 4 and/or FIG. 5, the transmitter/receiver devices 310 and 320 may transmit signals on both the wide band and the narrow band before communicating. As a result, the transmitter/receiver devices 310 and 320 avoid collisions and increase quality and/or reliability of communications.

As indicated above, FIG. 3 is provided as an example. Other examples may differ from what is described with respect to FIG. 3.

Figure 4:
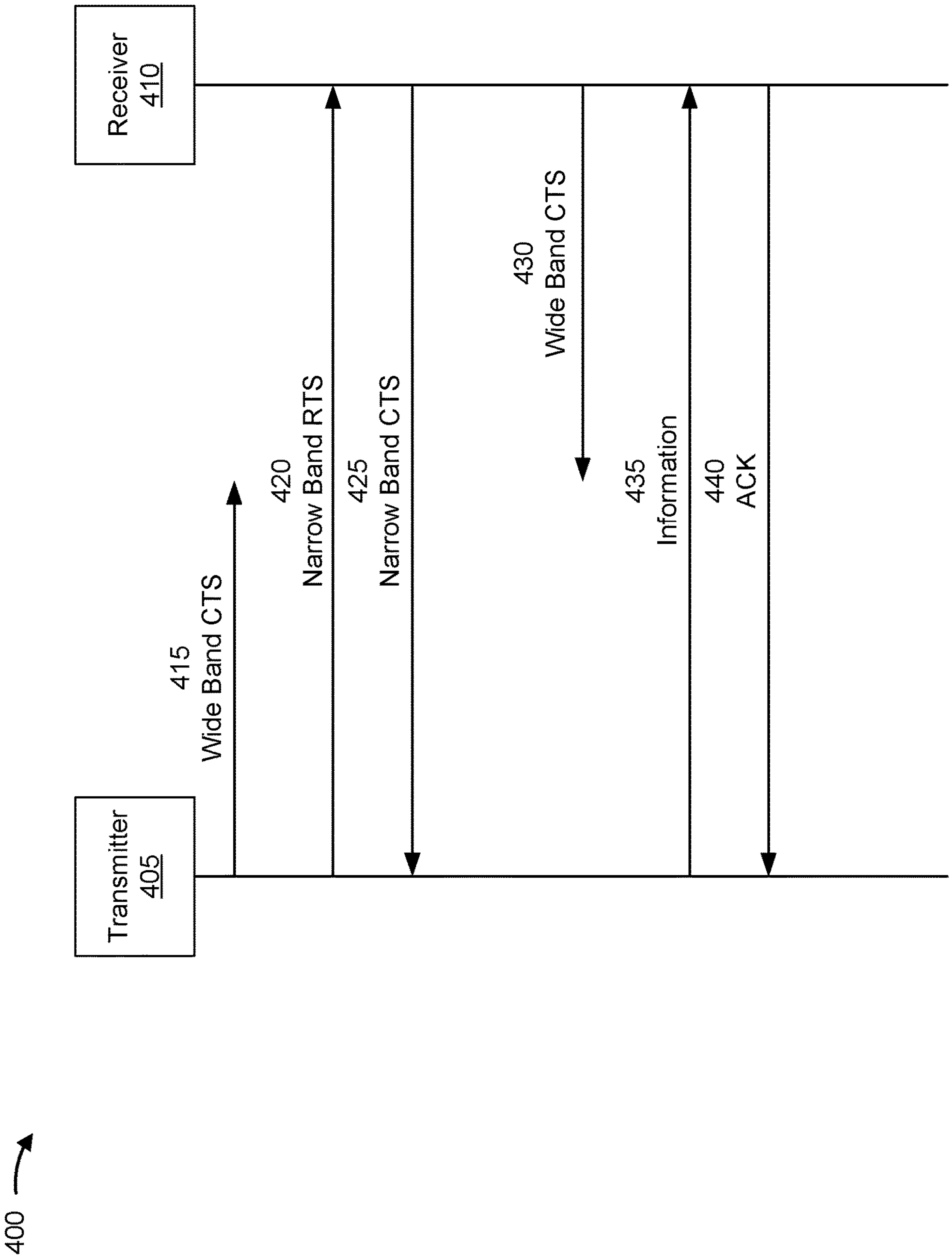

FIG. 4 is a diagram illustrating an example 400 associated with using wide band and narrow band communications with a mobile station, in accordance with the present disclosure. As shown in FIG. 4, a transmitter 405 and a receiver 410 may communicate with one another wirelessly (e.g., according to WLAN standards, such as the IEEE 802.11 protocols). In some aspects, the transmitter 405 may include one of the controller 305 or the mobile station 315, as described above in connection with FIG. 3. Similarly, the receiver 410 may include the other of the controller 305 or the mobile station 315, as described above in connection with FIG. 3.

The transmitter 405 may have information to transmit, to the receiver 410, using a selected band of a wide band (e.g., associated with a bandwidth equal to or greater than 20 MHz) or a narrow band (e.g., associated with a bandwidth less than 20 MHz). The transmitter 405 and/or the receiver 410 may select the band using a type of traffic and/or at least one distance between the transmitter 405 and the receiver 410, as described above in connection with FIG. 3. In example 400, the transmitter 405 and/or the receiver 410 may select the narrow band.

Accordingly, as shown by reference number 415, the transmitter 405 may transmit, on the wide band, a clear to send (CTS) signal. For example, the transmitter 405 may transmit a CTS signal, according to IEEE 802.11 protocols, that has a preamble associated with the wide band. The CTS signal may prevent collision of the information (e.g., transmitted as described below in connection with reference number 435) with transmissions from other wide band devices near the transmitter 405. For example, a wide band device near the transmitter 405 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the transmitter 405 using the CTS signal.

As shown by reference number 420, the transmitter 405 may transmit, and the receiver 410 may receive, on the narrow band, a request to send (RTS) signal. For example, the transmitter 405 may transmit an RTS signal, according to IEEE 802.11 protocols, that has a preamble associated with the narrow band. For example, the transmitter 405 may transmit an RTS signal, according to IEEE 802.11 protocols, that has a preamble associated with the narrow band. The RTS signal may prevent collision of the information (e.g., transmitted as described below in connection with reference number 435) with transmissions from other narrow band devices near the transmitter 405 and/or near the receiver 410. For example, a narrow band device near the transmitter 405 and/or the receiver 410 may decode the RTS signal and determine not to transmit for an amount of time based at least in part on the RTS signal. The amount of time may be programmed and/or otherwise preconfigured (e.g., according to IEEE 802.11 protocols and/or another standard) or may be indicated by the transmitter 405 using the RTS signal.

In some aspects, an amount of time between transmitting the CTS on the wide band and transmitting the RTS on the narrow band may be based at least in part on an interframe spacing and a switching time. For example, the interframe spacing may include a short interframe space (SIFS) associated with the wide band. In some aspects, the SIFS associated with the wide band may be down-clocked. For example, an amount of time associated with the SIFS may be increased because the transmitter 405 and/or the receiver 410 may operate at a reduced clock rate.

The switching time may include an amount of time that the transmitter 405 uses to reconfigure (e.g., using one or more digital and/or analog signals) one or more antennas, RF chains, and/or other hardware transmission components to transmit on the narrow band after transmitting on the wide band. In some aspects, the amount of time between transmitting the CTS on the wide band and transmitting the RTS on the narrow band may further be based on an amount of time for a modem driver, an operating system, and/or another higher-level software to generate instructions that cause the transmitter 405 to transmit the RTS on the narrow band. In some aspects, the transmitter 405 may include hardware configured for communication on the wide band that is at least partially separate from hardware configured for communication on the narrow band. Accordingly, in some aspects, the switching time for the transmitter 405 may be zero.

As shown by reference number 425, the receiver 410 may transmit, and the transmitter 405 may receive, on the narrow band and based at least in part on the RTS signal, a CTS signal. For example, the receiver 410 may transmit a CTS signal, according to IEEE 802.11 protocols, that has a preamble associated with the narrow band. The CTS signal may prevent collision of the information (e.g., received as described below in connection with reference number 435) with transmissions from other narrow band devices near the transmitter 405 and/or near the receiver 410. For example, a narrow band device near the transmitter 405 and/or the receiver 410 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the receiver 410 using the CTS signal.

In some aspects, an amount of time between receiving the RTS on the narrow band and transmitting the CTS on the narrow band may be based at least in part on an interframe spacing. For example, the interframe spacing may include an SIFS associated with the narrow band. In some aspects, the SIFS associated with the narrow band may be down-clocked. For example, an amount of time associated with the SIFS may be increased because the transmitter 405 and/or the receiver 410 may operate at a reduced clock rate.

Additionally, or alternatively, the transmitter 405 may receive the CTS signal within a threshold amount of time. In some aspects, the threshold amount of time may be based at least in part on the interframe spacing and a switching time. The switching time may include an amount of time that the receiver 410 uses to reconfigure (e.g., using one or more digital and/or analog signals) one or more antennas, RF chains, and/or other hardware transmission components to transmit on the narrow band after transmitting on the wide band. In some aspects, the receiver 410 may include hardware configured for communication on the wide band that is at least partially separate from hardware configured for communication on the narrow band. Accordingly, in some aspects, the switching time for the receiver 410 may be zero.

In some aspects, the threshold amount of time may further be based on an amount of time for a modem driver, an operating system, and/or another higher-level software to generate instructions that cause the receiver 410 to transmit the CTS on the narrow band. Accordingly, the transmitter 405 may refrain from transmitting the information (e.g., as described below in connection with reference number 435) when the transmitter 405 does not receive the CTS signal within the threshold amount of time. For example, the transmitter 405 may determine that the receiver 410 did not transmit the CTS signal on the narrow band because other narrow band devices near the receiver 410 are scheduling at least one other transmission such that the information would collide with at least one other transmission.

As shown by reference number 430, the receiver 410 may transmit, on the wide band, a CTS signal. For example, the receiver 410 may transmit a CTS signal, according to IEEE 802.11 protocols, that has a preamble associated with the wide band. The CTS signal may prevent collision of the information (e.g., received as described below in connection with reference number 435) with transmissions from other wide band devices near the receiver 410. For example, a wide band device near the receiver 410 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the receiver 410 using the CTS signal.

In some aspects, an amount of time between transmitting the CTS on the narrow band and transmitting the CTS on the wide band may be based at least in part on an interframe spacing and a switching time. For example, the interframe spacing may include the SIB associated with the narrow band (e.g., as described above). The switching time may include an amount of time that the receiver 410 uses to reconfigure (e.g., using one or more digital and/or analog signals) one or more antennas, RF chains, and/or other hardware transmission components to transmit on the wide band after transmitting on the narrow band. In some aspects, the amount of time between transmitting the CTS on the narrow band and transmitting the CTS on the wide band may further be based on an amount of time for a modem driver, an operating system, and/or another higher-level software to generate instructions that cause the receiver 410 to transmit the CTS on the wide band.

In some aspects, the receiver 410 may transmit the CTS signal on the wide band based at least in part on receiving the RTS signal on the narrow band. For example, the higher-level software may determine, based at least in part on the RTS signal, to transmit a CTS signal on the wide band in addition to the CTS signal transmitted on the narrow band. Accordingly, the receiver 410 may use a MAC layer implemented in hardware with the higher-level software causing transmission of the CTS signal on the wide band. Thus, MAC layers that are hardware-based can implement techniques as described in connection with FIG. 4 without being replaced by new hardware.

As shown by reference number 435, the transmitter 405 may transmit, and the receiver 410 may receive, the information on the narrow band, based at least in part on the CTS signal on the narrow band. As shown in FIG. 4, the transmitter 405 does not receive the CTS signal on the wide band from the receiver 410. Accordingly, the transmitter 405 may transmit the information on the narrow band based at least in part on a programmed (and/or otherwise preconfigured) amount of time after receiving the CTS signal on the narrow band. For example, the transmitter 405 may estimate the amount of time based at least in part on an interframe spacing (e.g., the SIFS associated with the narrow band as described above), a switching time (e.g., an amount of time that the receiver 410 uses to reconfigure to transmit on the wide band after transmitting on the narrow band as described above), an amount of time for a higher-level software of the receiver 410 to generate instructions that cause the receiver 410 to transmit the CTS on the wide band, an amount of time that is based at least in part on an estimate of any hardware and/or software delays between the receiver 410 receiving the RTS and transmitting the CTS on the wide band, and/or an amount of time that is based at least in part on an estimate for wide band devices near the receiver 410 to receive the CTS on the wide band and refrain from transmitting on the wide band.

As shown by reference number 440, the receiver 410 may transmit, and the transmitter 405 may receive, an acknowledgment (ACK) signal on the narrow band, based at least in part on the information. For example, the receiver 410 may transmit an ACK frame and/or a block acknowledgement (BA) frame, according to IEEE 802.11 protocols, that has a preamble associated with the narrow band. In some aspects, an amount of time between receiving the information on the narrow band and transmitting the ACK signal on the narrow band may be based at least in part on an interframe spacing. For example, the interframe spacing may include the SIFS associated with the narrow band (e.g., as described above).

In some aspects, the receiver 410 may not receive the information within a threshold amount of time. For example, the receiver 410 may transmit a contention free end (CF-END) frame according to IEEE 802.11 protocols and/or otherwise indicate that the information was not received when the receiver 410 does not receive the information within the threshold amount of time. Accordingly, the receiver 410 may determine that the transmitter 405 did not transmit the information on the narrow band and/or that the information was lost based at least in part on poor radio conditions or interference.

By using techniques as described in connection with FIG. 4, the transmitter 405 and the receiver 410 may communicate using a selected band of either a wide band or a narrow band. Additionally, the transmitter 405 and the receiver 410 may transmit signals on both the wide band and the narrow band before communicating. As a result, the transmitter 405 and the receiver 410 may avoid collisions and increase quality and/or reliability of communications. Additionally, the transmitter 405 and the receiver 410 may communicate across longer distances (e.g., by communicating on the narrow band as shown in FIG. 4) but also increase throughput across shorter distances (e.g., by communicating on the wide band).

As indicated above, FIG. 4 is provided as an example. Other examples may differ from what is described with respect to FIG. 4.

Figure 5:
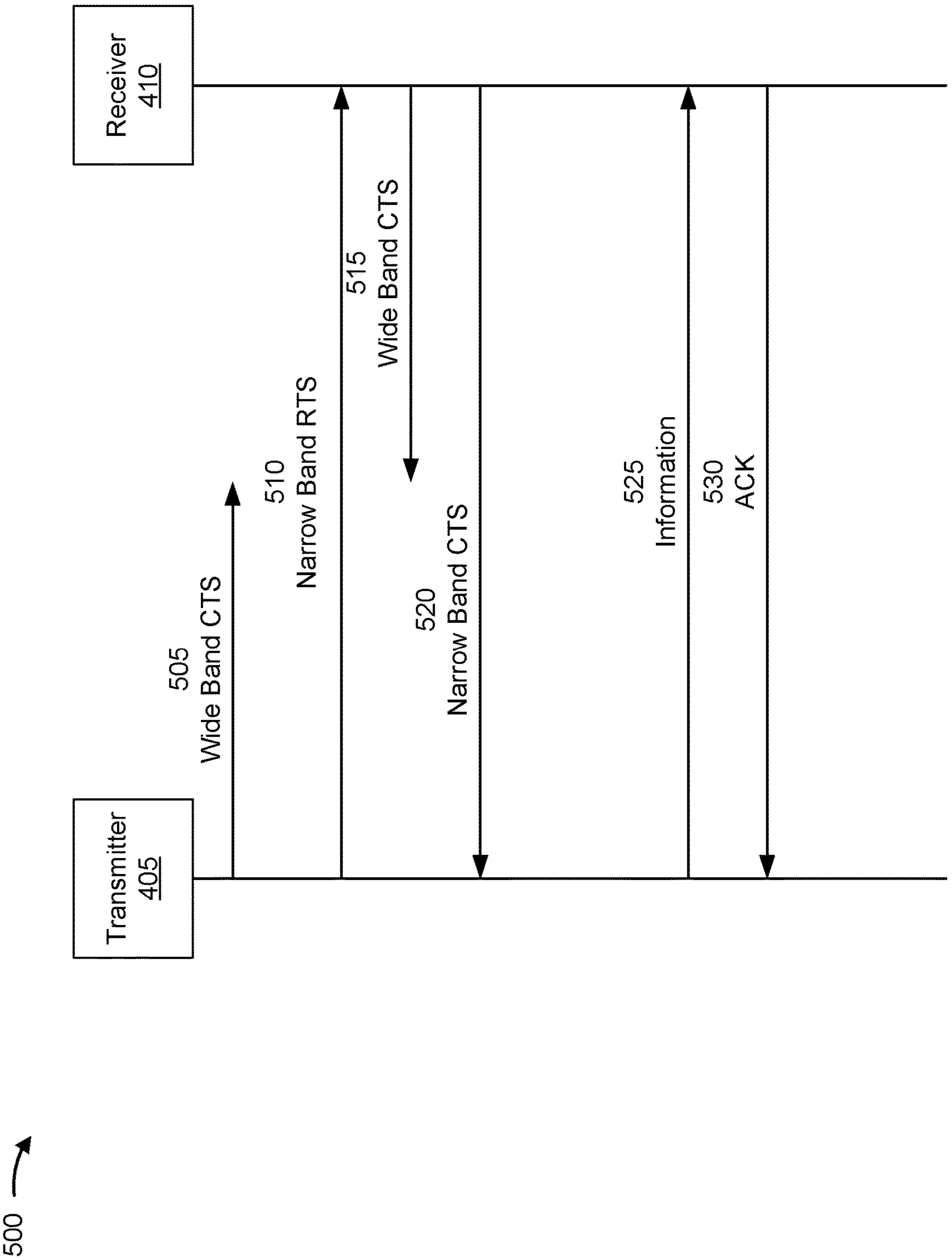

FIG. 5 is a diagram illustrating an example 500 associated with using wide band and narrow band communications with a mobile station, in accordance with the present disclosure. As shown in FIG. 5, a transmitter 405 and a receiver 410 may communicate with one another wirelessly (e.g., according to WLAN standards, such as the IEEE 802.11 protocols). In some aspects, the transmitter 405 may include one of the controller 305 or the mobile station 315, as described above in connection with FIG. 3. Similarly, the receiver 410 may include the other of the controller 305 or the mobile station 315, as described above in connection with FIG. 3.

The transmitter 405 may have information to transmit, to the receiver 410, using a selected band of a wide band (e.g., associated with a bandwidth equal to or greater than 20 MHz) or a narrow band (e.g., associated with a bandwidth less than 20 MHz). The transmitter 405 and/or the receiver 410 may select the band using a type of traffic and/or at least one distance between the transmitter 405 and the receiver 410, as described above in connection with FIG. 3. In example 500, the transmitter 405 and/or the receiver 410 may select the narrow band.

Accordingly, as shown by reference number 505, the transmitter 405 may transmit, on the wide band, a CTS signal. For example, the transmitter 405 may transmit a CTS signal, according to IEEE 802.11 protocols, that has a preamble associated with the wide band. The CTS signal may prevent collision of the information (e.g., transmitted as described below in connection with reference number 525) with transmissions from other wide band devices near the transmitter 405. For example, a wide band device near the transmitter 405 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the transmitter 405 using the CTS signal.

As shown by reference number 510, the transmitter 405 may transmit, and the receiver 410 may receive, on the narrow band, an RTS signal. For example, the transmitter 405 may transmit an RTS signal, according to IEEE 802.11 protocols, that has a preamble associated with the narrow band. For example, the transmitter 405 may transmit an RTS signal, according to IEEE 802.11 protocols, that has a preamble associated with the narrow band. The RTS signal may prevent collision of the information (e.g., transmitted as described below in connection with reference number 525) with transmissions from other narrow band devices near the transmitter 405 and/or near the receiver 410. For example, a narrow band device near the transmitter 405 and/or the receiver 410 may decode the RTS signal and determine not to transmit for an amount of time based at least in part on the RTS signal. The amount of time may be programmed and/or otherwise preconfigured (e.g., according to IEEE 802.11 protocols and/or another standard) or may be indicated by the transmitter 405 using the RTS signal.

In some aspects, an amount of time between transmitting the CTS on the wide band and transmitting the RTS on the narrow band may be based at least in part on an interframe spacing and a switching time. For example, the interframe spacing may include an SIFS associated with the wide band. In some aspects, the SIFS associated with the wide band may be down-clocked. For example, an amount of time associated with the SIFS may be increased because the transmitter 405 and/or the receiver 410 may operate at a reduced clock rate.

The switching time may include an amount of time that the transmitter 405 uses to reconfigure (e.g., using one or more digital and/or analog signals) one or more antennas, RF chains, and/or other hardware transmission components to transmit on the narrow band after transmitting on the wide band. In some aspects, the transmitter 405 may include hardware configured for communication on the wide band that is at least partially separate from hardware configured for communication on the narrow band. Accordingly, in some aspects, the switching time for the transmitter 405 may be zero. In some aspects, the amount of time between transmitting the CTS on the wide band and transmitting the RTS on the narrow band may further be based on an amount of time for a modem driver, an operating system, and/or another higher-level software to generate instructions that cause the transmitter 405 to transmit the RTS on the narrow band.

As shown by reference number 515, the receiver 410 may transmit, on the wide band, a CTS signal. For example, the receiver 410 may transmit a CTS signal, according to IEEE 802.11 protocols, that has a preamble associated with the wide band. The CTS signal may prevent collision of the information (e.g., received as described below in connection with reference number 525) with transmissions from other wide band devices near the receiver 410. For example, a wide band device near the receiver 410 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the receiver 410 using the CTS signal.

In some aspects, an amount of time between transmitting the CTS on the narrow band and transmitting the CTS on the wide band may be based at least in part on an interframe spacing and a switching time. For example, the interframe spacing may include an SIFS associated with the narrow band. In some aspects, the SIFS associated with the narrow band may be down-clocked. For example, an amount of time associated with the SIFS may be increased because the transmitter 405 and/or the receiver 410 may operate at a reduced clock rate. The switching time may include an amount of time that the receiver 410 uses to reconfigure (e.g., using one or more digital and/or analog signals) one or more antennas, RF chains, and/or other hardware transmission components to transmit on the wide band after receiving on the narrow band. In some aspects, the receiver 410 may include hardware configured for communication on the wide band that is at least partially separate from hardware configured for communication on the narrow band. Accordingly, in some aspects, the switching time for the receiver 410 may be zero.

In some aspects, the receiver 410 may transmit the CTS signal on the wide band based at least in part on receiving the RTS signal on the narrow band. For example, a MAC layer of the receiver 410 may determine, based at least in part on the RTS signal, to transmit a CTS signal on the wide band in addition to the CTS signal transmitted on the narrow band. Accordingly, the receiver 410 may use a MAC layer implemented in hardware such that the MAC layer triggers transmission of a CTS signal both on the wide band and the narrow band in response to receiving an RTS signal on the narrow band. As an alternative, the receiver 410 may use a MAC layer implemented in software that includes instructions to transmit a CTS signal both on the wide band and the narrow band in response to receiving an RTS signal on the narrow band. The MAC layers described above reduce a latency between receiving the RTS signal on the narrow band and transmitting the CTS signal the wide band such that the latency of example 500 is lower as compared with example 400. Additionally, the transmitter 405 may transmit the information without waiting a programmed amount of time (e.g., as described above in connection with reference number 435 of FIG. 4), which decreases latency and increases reliability.

As shown by reference number 520, the receiver 410 may transmit, and the transmitter 405 may receive, on the narrow band and based at least in part on the RTS signal, a CTS signal. For example, the receiver 410 may transmit a CTS signal, according to IEEE 802.11 protocols, that has a preamble associated with the narrow band. The CTS signal may prevent collision of the information (e.g., received as described below in connection with reference number 525) with transmissions from other narrow band devices near the transmitter 405 and/or near the receiver 410. For example, a narrow band device near the transmitter 405 and/or the receiver 410 may decode the CTS signal and determine not to transmit for an amount of time based at least in part on the CTS signal. The amount of time may be programmed and/or otherwise preconfigured (e.g., according to IEEE 802.11 protocols and/or another standard) or may be indicated by the receiver 410 using the CTS signal.

In some aspects, an amount of time between transmitting the CTS on the wide band and transmitting the CTS on the narrow band may be based at least in part on an interframe spacing and a switching time. For example, the interframe spacing may include the SIFS associated with the wide band (e.g., as described above). The switching time may include an amount of time that the receiver 410 uses to reconfigure (e.g., using one or more digital and/or analog signals) one or more antennas, RF chains, and/or other hardware transmission components to transmit on the narrow band after transmitting on the wide band.

Additionally, or alternatively, the transmitter 405 may receive the CTS signal within a threshold amount of time. In some aspects, the threshold amount of time may be based at least in part on the interframe spacing and the switching time. Accordingly, the transmitter 405 may refrain from transmitting the information (e.g., as described below in connection with reference number 435) when the transmitter 405 does not receive the CTS signal within the threshold amount of time. For example, the transmitter 405 may determine that the receiver 410 did not transmit the CTS signal on the narrow band because other narrow band devices near the receiver 410 are scheduling at least one other transmission such that the information would collide with at least one other transmission.

As shown by reference number 525, the transmitter 405 may transmit, and the receiver 410 may receive, the information on the narrow band, based at least in part on the CTS signal on the narrow band. As shown in FIG. 4, the receiver 410 may transmit the CTS signal on the wide band before transmitting the CTS signal on the narrow band. Accordingly, the transmitter 405 may transmit the information on the narrow band after receiving the CTS signal on the narrow band. For example, the transmitter 405 may not wait a programmed amount of time (e.g., as described above in connection with reference number 435 of FIG. 4), which decreases latency and increases reliability for transmitting the information.

As shown by reference number 530, the receiver 410 may transmit, and the transmitter 405 may receive, an ACK signal on the narrow band, based at least in part on the information. For example, the receiver 410 may transmit an ACK frame and/or a BA frame, according to IEEE 802.11 protocols, that has a preamble associated with the narrow band. In some aspects, an amount of time between receiving the information on the narrow band and transmitting the ACK signal on the narrow band may be based at least in part on an interframe spacing. For example, the interframe spacing may include the SIFS associated with the narrow band (e.g., as described above).

In some aspects, the receiver 410 may not receive the information within a threshold amount of time. For example, the receiver 410 may transmit a CF-END frame according to IEEE 802.11 protocols and/or otherwise indicate that the information was not received when the receiver 410 does not receive the information within the threshold amount of time. Accordingly, the receiver 410 may determine that the transmitter 405 did not transmit the information on the narrow band and/or that the information was lost based at least in part on poor radio conditions or interference.

By using techniques as described in connection with FIG. 5, the transmitter 405 and the receiver 410 may communicate using a selected band of either a wide band or a narrow band. Additionally, the transmitter 405 and the receiver 410 may transmit signals on both the wide band and the narrow band before communicating. As a result, the transmitter 405 and the receiver 410 may avoid collisions and increase quality and/or reliability of communications. Additionally, the transmitter 405 and the receiver 410 may communicate across longer distances (e.g., by communicating on the narrow band as shown in FIG. 5) but also increase throughput across shorter distances (e.g., by communicating on the wide band).

As indicated above, FIG. 5 is provided as an example. Other examples may differ from what is described with respect to FIG. 5.

Figure 6:
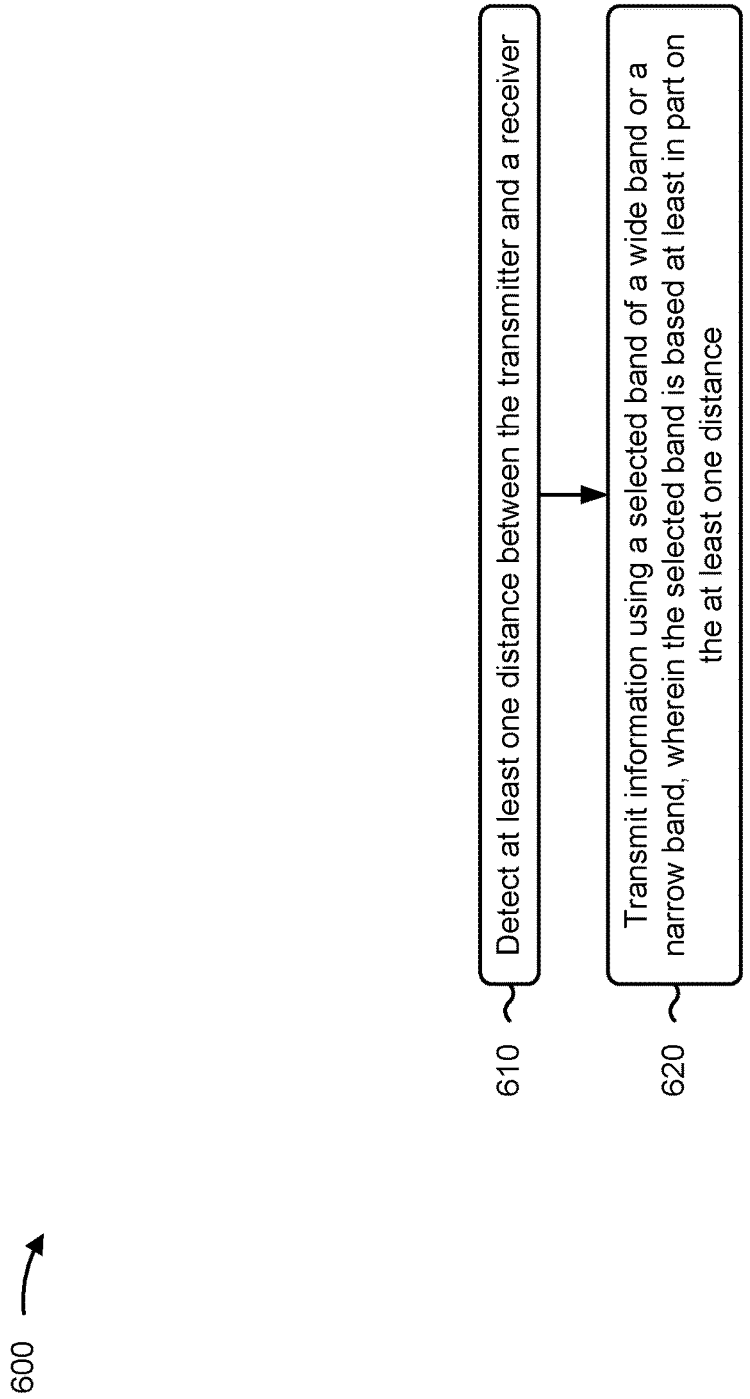
FIGS. 6 and 7 are diagrams illustrating example processes associated with using wide band and narrow band communications with a mobile station, in accordance with the present disclosure.

FIG. 6 is a diagram illustrating an example process 600 performed, for example, by a transmitter, in accordance with the present disclosure. Example process 600 is an example where the transmitter (e.g., transmitter 405 and/or apparatus 800 of FIG. 8) performs operations associated with nominal and subband preamble usage for extended range.

As shown in FIG. 6, in some aspects, process 600 may include detecting at least one distance between the transmitter and a receiver (e.g., receiver 410 and/or apparatus 900 of FIG. 9) (block 610). For example, the transmitter (e.g., using mobility component 808, depicted in FIG. 8) may detect the at least one distance between the transmitter and the receiver, as described above.

As further shown in FIG. 6, in some aspects, process 600 may include transmitting, to the receiver, information using a selected band of a wide band or a narrow band (block 620). For example, the transmitter (e.g., using transmission component 804, depicted in FIG. 8) may transmit the information using the selected band, as described above. In some aspects, the selected band is based at least in part on the at least one distance.

Process 600 may include additional aspects, such as any single aspect or any combination of aspects described below and/or in connection with one or more other processes described elsewhere herein.

In a first aspect, the transmitter comprises a drone, a UE, an MSS node, a P2P node, an NAN node, a WLAN access point, a WLAN station, or a controller device.

In a second aspect, alone or in combination with the first aspect, the narrow band has a bandwidth less than 20 MHz, and the wide band has a bandwidth greater than or equal to 20 MHz.

In a third aspect, alone or in combination with one or more of the first and second aspects, the information includes at least one of low-traffic data or high-traffic data, the low-traffic data includes control data, event information, status information, or text information, and the high-traffic data includes a video stream or a large file.

In a fourth aspect, alone or in combination with one or more of the first through third aspects, the narrow band includes at least one frequency that is included in the wide band.

In a fifth aspect, alone or in combination with one or more of the first through fourth aspects, the selected band is the narrow band; process 600 further includes transmitting (e.g., using transmission component 804), on the wide band, a clear to send signal, transmitting (e.g., using transmission component 804), on the narrow band, a request to send signal, and receiving (e.g., using reception component 802, depicted in FIG. 8), on the narrow band and based at least in part on transmitting the request to send signal, a clear to send signal; and the information is transmitted based at least in part on receiving the clear to send signal.

In a sixth aspect, alone or in combination with one or more of the first through fifth aspects, process 600 further includes receiving (e.g., using reception component 802), on the narrow band and based at least in part on transmitting the information, an acknowledgment signal.

In a seventh aspect, alone or in combination with one or more of the first through sixth aspects, the clear to send signal is received within a threshold amount of time, and the threshold amount of time is based at least in part on an interframe spacing and a switching time.

In an eighth aspect, alone or in combination with one or more of the first through seventh aspects, the interframe spacing is down-clocked.

In a ninth aspect, alone or in combination with one or more of the first through eighth aspects, the information is transmitted based at least in part on a programmed amount of time after the clear to send signal is received.

In a tenth aspect, alone or in combination with one or more of the first through ninth aspects, the information is transmitted within an interframe spacing after the clear to send signal is received.

In an eleventh aspect, alone or in combination with one or more of the first through tenth aspects, process 600 further includes transmitting (e.g., using transmission component 804), to the receiver, at least one frame indicating the selected band, or receiving (e.g., using reception component 802), from the receiver, the at least one frame indicating the selected band.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
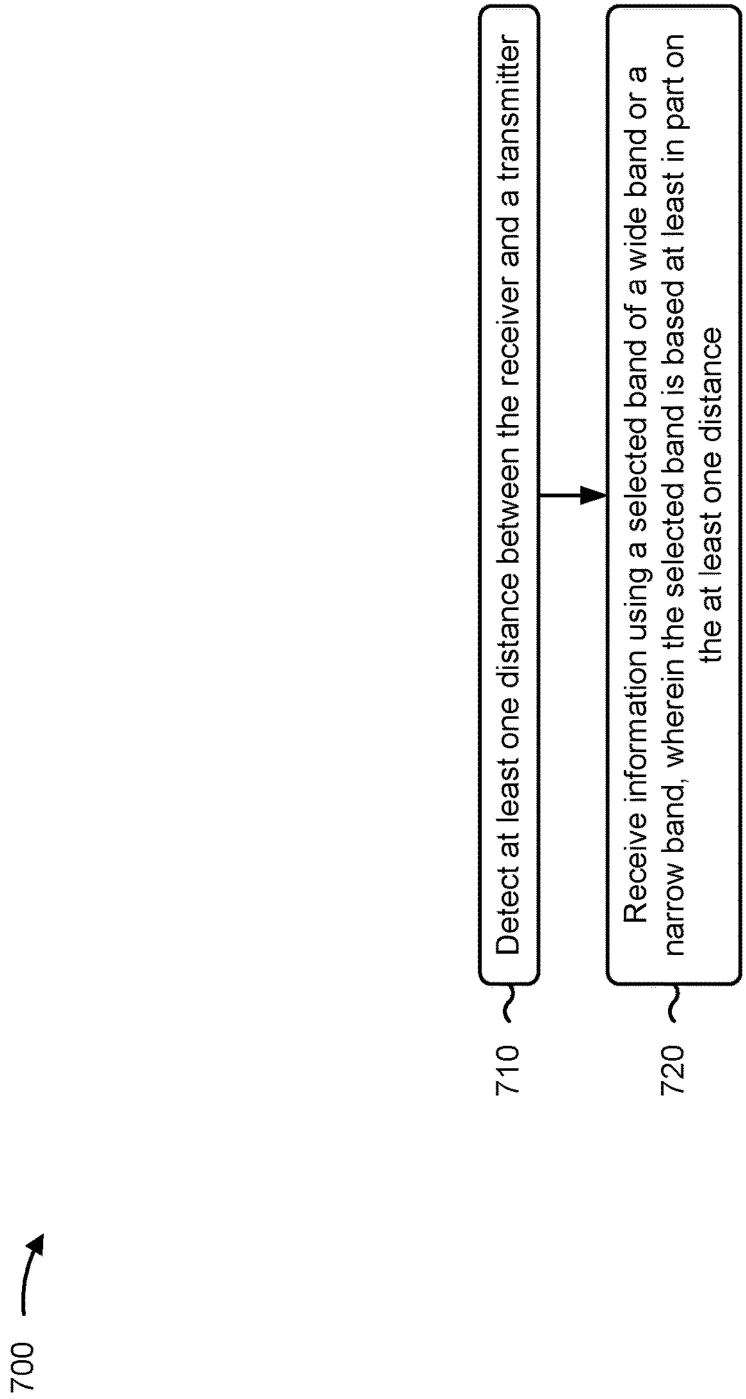

FIG. 7 is a diagram illustrating an example process 700 performed, for example, by a receiver, in accordance with the present disclosure. Example process 700 is an example where the receiver (e.g., receiver 410 and/or apparatus 900 of FIG. 9) performs operations associated with nominal and subband preamble usage for extended range.

As shown in FIG. 7, in some aspects, process 700 may include detecting at least one distance between the receiver and a transmitter (e.g., transmitter 405 and/or apparatus 800 of FIG. 8) (block 710). For example, the receiver (e.g., using detection component 908, depicted in FIG. 9) may detect the at least one distance between the receiver and the transmitter, as described above.

As further shown in FIG. 7, in some aspects, process 700 may include receiving, from the transmitter, information using a selected band of a wide band or a narrow band (block 720). For example, the receiver (e.g., using reception component 902, depicted in FIG. 9) may receive the information using the selected, as described above. In some aspects, the selected band is based at least in part on the at least one distance.

Process 700 may include additional aspects, such as any single aspect or any combination of aspects described below and/or in connection with one or more other processes described elsewhere herein.

In a first aspect, the receiver comprises a drone, a UE, an MSS node, a P2P node, an NAN node, a WLAN access point, a WLAN station, or a controller device.

In a second aspect, alone or in combination with the first aspect, the narrow band has a bandwidth less than 20 MHz, and the wide band has a bandwidth greater than or equal to 20 MHz.

In a third aspect, alone or in combination with one or more of the first and second aspects, the information includes at least one of low-traffic data or high-traffic data, the low-traffic data includes control data, event information, status information, or text information, and the high-traffic data includes a video stream or a large file.

In a fourth aspect, alone or in combination with one or more of the first through third aspects, the narrow band includes at least one frequency that is included in the wide band.

In a fifth aspect, alone or in combination with one or more of the first through fourth aspects, the selected band is the narrow band; process 700 further includes receiving (e.g., using reception component 902), on the narrow band, a request to send signal, transmitting (e.g., using transmission component 904, depicted in FIG. 9), on the narrow band and based at least in part on receiving the request to send signal, a clear to send signal, and transmitting (e.g., using transmission component 904), on the wide band, a clear to send signal; and the information is received based at least in part on transmitting the clear to send signal on the narrow band.

In a sixth aspect, alone or in combination with one or more of the first through fifth aspects, process 700 further includes transmitting (e.g., using transmission component 904), on the narrow band and based at least in part on receiving the information, an acknowledgment signal.

In a seventh aspect, alone or in combination with one or more of the first through sixth aspects, the information is received within a threshold amount of time, and the threshold amount of time is based at least in part on an interframe spacing and a switching time.

In an eighth aspect, alone or in combination with one or more of the first through seventh aspects, the interframe spacing is down-clocked.

In a ninth aspect, alone or in combination with one or more of the first through eighth aspects, the information is received based at least in part on a programmed amount of time after the clear to send signal is transmitted on the narrow band.

In a tenth aspect, alone or in combination with one or more of the first through ninth aspects, the clear to send signal on the wide band is transmitted within an interframe spacing and a switching time after the request to send signal is received.

In an eleventh aspect, alone or in combination with one or more of the first through tenth aspects, the clear to send signal on the wide band is transmitted using a MAC layer implemented in hardware.

In a twelfth aspect, alone or in combination with one or more of the first through eleventh aspects, the clear to send signal on the wide band is transmitted using a MAC layer implemented in software.

In a thirteenth aspect, alone or in combination with one or more of the first through twelfth aspects, process 700 further includes transmitting (e.g., using transmission component 904), to the transmitter, at least one frame indicating the selected band, or receiving (e.g., using reception component 902), from the transmitter, the at least one frame indicating the selected band.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
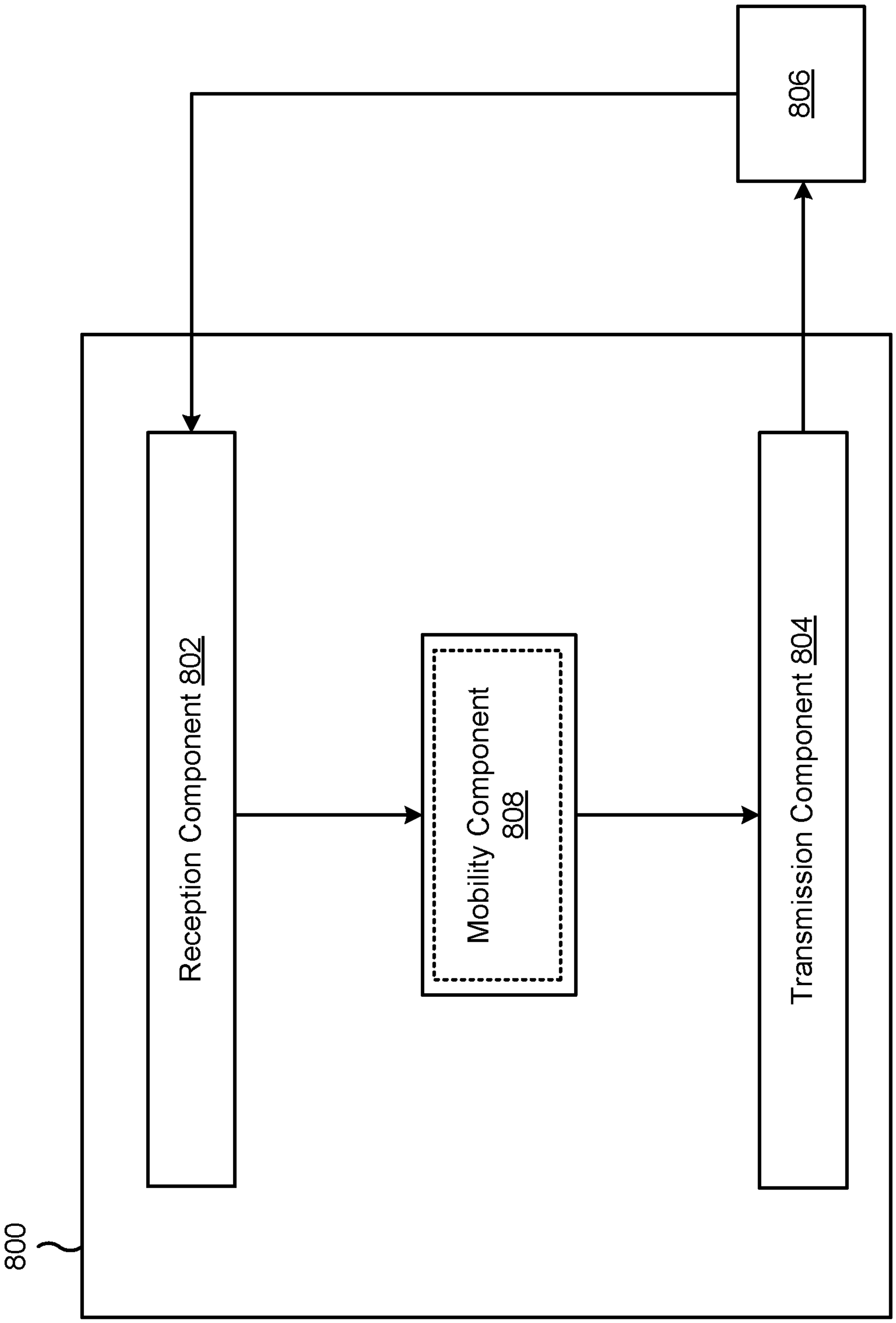
FIGS. 8 and 9 are block diagrams of example apparatuses for wireless communication, in accordance with the present disclosure.

FIG. 8 is a block diagram of an example apparatus 800 for wireless communication. The apparatus 800 may be a transmitter, or a transmitter may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a receiver or another wireless communication device) using the reception component 802 and the transmission component 804. As further shown, the apparatus 800 may include a mobility component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE and/or the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE and/or the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE and/or the base station described above in connection with FIG. 2. In some aspects, the transmission component 804 may be co-located with the reception component 802 in a transceiver.

In some aspects, the mobility component 808 may detect at least one distance between the apparatus 800 and the apparatus 806. In some aspects, the mobility component 808 may include a transmit MIMO processor, a transmit processor, a MIMO detector, a receive processor, a controller/processor, a memory, or a combination thereof, of the UE and/or the base station described above in connection with FIG. 2. Moreover, the transmission component 804 may transmit, to the apparatus 806, information using a selected band of a wide band or a narrow band. In some aspects, the selected band is based at least in part on the at least one distance. For example, the mobility component 808 may select the band using the at least one distance and a threshold distance.

In some aspects, the transmission component 804 may transmit, to the apparatus 806, at least one frame indicating the selected band. Additionally, or alternatively, the reception component 802 may receive, from the apparatus 806, at least one frame indicating the selected band.

Before transmitting the information, the transmission component 804 may transmit, on the wide band, a clear to send signal, and transmit, on the narrow band, a request to send signal. Accordingly, the reception component 802 may receive, on the narrow band and based at least in part on the transmission component 804 transmitting the request to send signal, a clear to send signal. The transmission component 804 may thus transmit the information based at least in part on the reception component 802 receiving the clear to send signal.

In some aspects, the reception component 802 may further receive, on the narrow band and based at least in part on the transmission component 804 transmitting the information, an acknowledgment signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
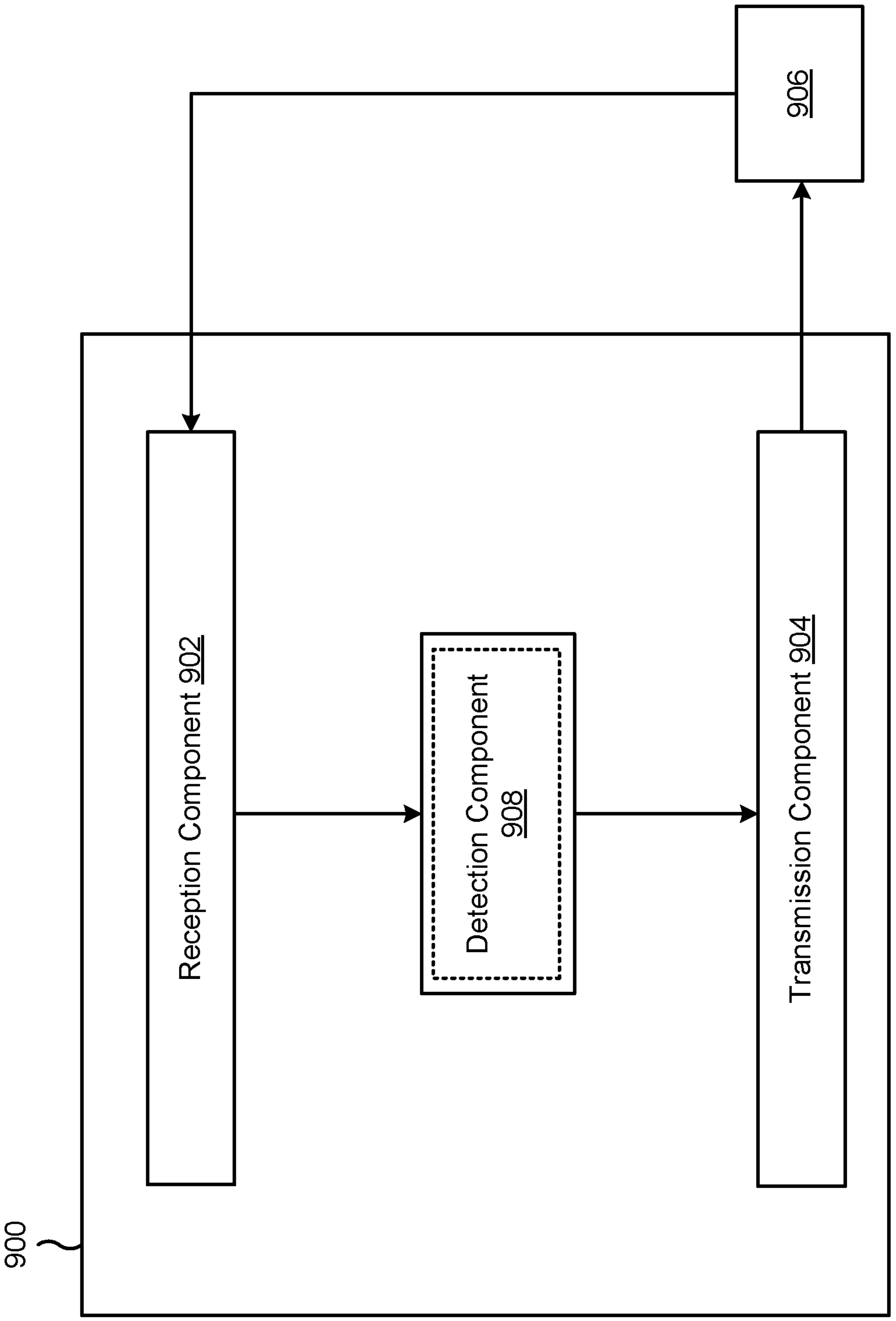

FIG. 9 is a block diagram of an example apparatus 900 for wireless communication. The apparatus 900 may be a receiver, or a receiver may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a transmitter or another wireless communication device) using the reception component 902 and the transmission component 904. As further shown, the apparatus 900 may include a detection component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE and/or the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE and/or the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE and/or the base station described above in connection with FIG. 2. In some aspects, the transmission component 904 may be co-located with the reception component 902 in a transceiver.

In some aspects, the detection component 908 may detect at least one distance between the apparatus 900 and the apparatus 906. In some aspects, the detection component 908 may include a transmit MIMO processor, a transmit processor, a MIMO detector, a receive processor, a controller/processor, a memory, or a combination thereof, of the UE and/or the base station described above in connection with FIG. 2. Moreover, the reception component 902 may receive, from the apparatus 906, information using a selected band of a wide band or a narrow band. In some aspects, the selected band is based at least in part on the at least one distance. For example, the detection component 908 may select the band using the at least one distance and a threshold distance.

In some aspects, the transmission component 904 may transmit, to the apparatus 906, at least one frame indicating the selected band. Additionally, or alternatively, the reception component 902 may receive, from the apparatus 906, at least one frame indicating the selected band.

Before receiving the information, the reception component 902 may receive, on the narrow band, a request to send signal. Accordingly, the transmission component 904 may transmit, on the narrow band and based at least in part on the reception component 902 receiving the request to send signal, a clear to send signal. Additionally, the transmission component 904 may transmit, on the wide band, a clear to send signal. The reception component 902 may thus receive the information based at least in part on the transmission component 904 transmitting the clear to send signal on the narrow band.

In some aspects, the transmission component 904 may further transmit, on the narrow band and based at least in part on the reception component 902 receiving the information, an acknowledgment signal.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a transmitter, comprising: detecting at least one distance between the transmitter and a receiver; and transmitting, to the receiver, information using a selected band of a wide band or a narrow band, wherein the selected band is based at least in part on the at least one distance.

Aspect 2: The method of Aspect 1, wherein the transmitter comprises a drone, a user equipment, an independent basic service set node, a peer-to-peer node, a neighbor aware network node, a wireless local area network (WLAN) access point, a WLAN station, or a controller device.

Aspect 3: The method of any of Aspects 1 through 2, wherein the narrow band has a bandwidth less than 20 MHz, and the wide band has a bandwidth greater than or equal to 20 MHz.

Aspect 4: The method of any of Aspects 1 through 3, wherein the information includes at least one of low-traffic data or high-traffic data, the low-traffic data includes control data, event information, status information, or text information, and the high-traffic data includes a video stream or a large file.

Aspect 5: The method of any of Aspects 1 through 4, wherein the narrow band includes at least one frequency that is included in the wide band.

Aspect 6: The method of any of Aspects 1 through 5, wherein the selected band is the narrow band, and wherein the method further comprises: transmitting, on the wide band, a clear to send signal; transmitting, on the narrow band, a request to send signal; and receiving, on the narrow band and based at least in part on transmitting the request to send signal, a clear to send signal, wherein the information is transmitted based at least in part on receiving the clear to send signal.

Aspect 7: The method of Aspect 6, wherein the clear to send signal is received within a threshold amount of time, and the threshold amount of time is based at least in part on an interframe spacing and a switching time.

Aspect 8: The method of Aspect 7, wherein the interframe spacing is down-clocked.

Aspect 9: The method of any of Aspects 6 through 8, wherein the information is transmitted based at least in part on a programmed amount of time after the clear to send signal is received.

Aspect 10: The method of any of Aspects 6 through 8, wherein the information is transmitted within an interframe spacing after the clear to send signal is received.

Aspect 11: The method of any of Aspects 1 through 10, further comprising: receiving, on the narrow band and based at least in part on transmitting the information, an acknowledgment signal.

Aspect 12: The method of any of Aspects 1 through 11, further comprising: transmitting, to the receiver, at least one frame indicating the selected band; or receiving, from the receiver, the at least one frame indicating the selected band.

Aspect 13: A method of wireless communication performed by a receiver, comprising: detecting at least one distance between the receiver and a transmitter; and receiving, from the transmitter, information using a selected band of a wide band or a narrow band, wherein the selected band is based at least in part on the at least one distance.

Aspect 14: The method of Aspect 13, wherein the receiver comprises a drone, a user equipment, an independent basic service set node, a peer-to-peer node, a neighbor aware network node, a wireless local area network (WLAN) access point, a WLAN station, or a controller device.

Aspect 15: The method of any of Aspects 13 through 14, the narrow band has a bandwidth less than 20 MHz, and the wide band has a bandwidth greater than or equal to 20 MHz.

Aspect 16: The method of any of Aspects 13 through 15, wherein the information includes at least one of low-traffic data or high-traffic data, the low-traffic data includes control data, event information, status information, or text information, and the high-traffic data includes a video stream or a large file.

Aspect 17: The method of any of Aspects 13 through 16, wherein the narrow band includes at least one frequency that is included in the wide band.

Aspect 18: The method of any of Aspects 13 through 17, wherein the selected band is the narrow band, and wherein the method further comprises: receiving, on the narrow band, a request to send signal; transmitting, on the narrow band and based at least in part on receiving the request to send signal, a clear to send signal; and transmitting, on the wide band, a clear to send signal, wherein the information is received based at least in part on transmitting the clear to send signal on the narrow band.

Aspect 19: The method of Aspect 18, wherein the information is received within a threshold amount of time, and the threshold amount of time is based at least in part on an interframe spacing and a switching time.

Aspect 20: The method of Aspect 19, wherein the interframe spacing is down-clocked.

Aspect 21: The method of any of Aspects 18 through 20, wherein the information is received based at least in part on a programmed amount of time after the clear to send signal is transmitted on the narrow band.

Aspect 22: The method of any of Aspects 18 through 20, wherein the clear to send signal on the wide band is transmitted within an interframe spacing and a switching time after the request to send signal is received.

Aspect 23: The method of any of Aspects 18 through 22, wherein the clear to send signal on the wide band is transmitted using a medium access control layer implemented in hardware.

Aspect 24: The method of any of Aspects 18 through 22, wherein the clear to send signal on the wide band is transmitted using a medium access control layer implemented in software.

Aspect 25: The method of any of Aspects 13 through 24, further comprising: transmitting, on the narrow band and based at least in part on receiving the information, an acknowledgment signal.

Aspect 26: The method of any of Aspects 13 through 25, further comprising: transmitting, to the transmitter, at least one frame indicating the selected band; or receiving, from the transmitter, the at least one frame indicating the selected band.

Aspect 27: An apparatus for wireless communication at a device, comprising a processor; memory coupled with the processor; and instructions stored in the memory and executable by the processor to cause the apparatus to perform the method of one or more Aspects of Aspects 1-12.

Aspect 28: A device for wireless communication, comprising a memory and one or more processors coupled to the memory, the memory and the one or more processors configured to perform the method of one or more Aspects of Aspects 1-12.

Aspect 29: An apparatus for wireless communication, comprising at least one means for performing the method of one or more Aspects of Aspects 1-12.

Aspect 30: A non-transitory computer-readable medium storing code for wireless communication, the code comprising instructions executable by a processor to perform the method of one or more Aspects of Aspects 1-12.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-12.

Aspect 32: An apparatus for wireless communication at a device, comprising a processor; memory coupled with the processor; and instructions stored in the memory and executable by the processor to cause the apparatus to perform the method of one or more Aspects of Aspects 13-26.

Aspect 33: A device for wireless communication, comprising a memory and one or more processors coupled to the memory, the memory and the one or more processors configured to perform the method of one or more Aspects of Aspects 13-26.

Aspect 34: An apparatus for wireless communication, comprising at least one means for performing the method of one or more Aspects of Aspects 13-26.

Aspect 35: A non-transitory computer-readable medium storing code for wireless communication, the code comprising instructions executable by a processor to perform the method of one or more Aspects of Aspects 13-26.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 13-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles “a” and “an” are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter for wireless communication, comprising:
- one or more memories; and
- one or more processors operatively coupled to the one or more memories, the one or more memories and the one or more processors configured to:
  - detect at least one distance between the transmitter and a receiver;
  - transmit, on a wide band, a first clear to send signal;
  - transmit, on a narrow band, a request to send signal;
  - receive, on the narrow band and based at least in part on transmitting the request to send signal, a second clear to send signal; and
  - transmit, to the receiver, information using a selected band of the wide band or the narrow band, wherein the selected band is the narrow band, wherein the information is transmitted based at least in part on receiving the second clear to send signal, and wherein the selected band is based at least in part on whether the at least one distance satisfies a threshold.

2. The transmitter of claim 1, wherein the transmitter comprises a drone, a user equipment, an independent basic service set node, a peer-to-peer node, a neighbor aware network node, a wireless local area network (WLAN) access point, a WLAN station, or a controller device.

3. The transmitter of claim 1, wherein the narrow band has a bandwidth less than 20 MHZ, and the wide band has a bandwidth greater than or equal to 20 MHz.

4. The transmitter of claim 1, wherein the information includes at least one of low-traffic data or high-traffic data, the low-traffic data includes control data, event information, status information, or text information, and the high-traffic data includes a video stream or a large file.

5. The transmitter of claim 1, wherein the narrow band includes at least one frequency that is included in the wide band.

6. The transmitter of claim 1, wherein the one or more memories and the one or more processors are further configured to:
- receive, on the narrow band and based at least in part on transmitting the information, an acknowledgment signal.

7. The transmitter of claim 1, wherein the second clear to send signal is received within a threshold amount of time, and the threshold amount of time is based at least in part on an interframe spacing and a switching time.

8. The transmitter of claim 7, wherein the interframe spacing is down-clocked.

9. The transmitter of claim 1, wherein the information is transmitted based at least in part on a programmed amount of time after the second clear to send signal is received.

10. The transmitter of claim 1, wherein the information is transmitted within an interframe spacing after the second clear to send signal is received.

11. The transmitter of claim 1, wherein the one or more memories and the one or more processors are further configured to:
- transmit, to the receiver, at least one frame indicating the selected band; or
- receive, from the receiver, the at least one frame indicating the selected band.

12. A receiver for wireless communication, comprising:
- one or more memories; and
- one or more processors operatively coupled to the one or more memories, the one or more memories and the one or more processors configured to:
  - detect at least one distance between the receiver and a transmitter;
  - receive, on a narrow band, a request to send signal;
  - transmit, on the narrow band and based at least in part on receiving the request to send signal, a first clear to send signal;
  - transmit, on a wide band, a second clear to send signal; and
  - receive, from the transmitter, information using a selected band of the wide band or the narrow band, wherein the selected band is the narrow band, wherein the information is received based at least in part on transmitting the first clear to send signal on the narrow band, and wherein the selected band is based at least in part on whether the at least one distance satisfies a threshold.

13. The receiver of claim 12, wherein the receiver comprises a drone, a user equipment, an independent basic service set node, a peer-to-peer node, a neighbor aware network node, a wireless local area network (WLAN) access point, a WLAN station, or a controller device.

14. The receiver of claim 12, wherein the narrow band has a bandwidth less than 20 MHz, and the wide band has a bandwidth greater than or equal to 20 MHz.

15. The receiver of claim 12, wherein the information includes at least one of low-traffic data or high-traffic data, the low-traffic data includes control data, event information, status information, or text information, and the high-traffic data includes a video stream or a large file.

16. The receiver of claim 12, wherein the narrow band includes at least one frequency that is included in the wide band.

17. The receiver of claim 12, wherein the one or more memories and the one or more processors are further configured to:
- transmit, on the narrow band and based at least in part on receiving the information, an acknowledgment signal.

18. The receiver of claim 12, wherein the information is received within a threshold amount of time, and the threshold amount of time is based at least in part on an interframe spacing and a switching time.

19. The receiver of claim 18, wherein the interframe spacing is down-clocked.

20. The receiver of claim 12, wherein the information is received based at least in part on a programmed amount of time after the first clear to send signal is transmitted on the narrow band.

21. The receiver of claim 12, wherein the second clear to send signal on the wide band is transmitted within an interframe spacing and a switching time after the request to send signal is received.

22. The receiver of claim 21, wherein the second clear to send signal on the wide band is transmitted using a medium access control layer implemented in hardware.

23. The receiver of claim 21, wherein the second clear to send signal on the wide band is transmitted using a medium access control layer implemented in software.

24. The receiver of claim 12, wherein the one or more memories and the one or more processors are further configured to:

transmit, to the transmitter, at least one frame indicating the selected band; or receive, from the transmitter, the at least one frame indicating the selected band.

25. A method of wireless communication performed by a transmitter, comprising:

detecting at least one distance between the transmitter and a receiver;

transmitting, on a wide band, a first clear to send signal;

transmitting, on a narrow band, a request to send signal;

receiving, on the narrow band and based at least in part on transmitting the request to send signal, a second clear to send signal; and transmitting, to the receiver, information using a selected band of the wide band or the narrow band, wherein the selected band is the narrow band, wherein the information is transmitted based at least in part on receiving the second clear to send signal, and wherein the selected band is based at least in part on whether the at least one distance satisfies a threshold.

26. A method of wireless communication performed by a receiver, comprising:

detecting at least one distance between the receiver and a transmitter;

receiving, on a narrow band, a request to send signal;

transmitting, on the narrow band and based at least in part on receiving the request to send signal, a first clear to send signal;

transmitting, on a wide band, a second clear to send signal; and receiving, from the transmitter, information using a selected band of the wide band or the narrow band, wherein the selected band is the narrow band, wherein the information is received based at least in part on transmitting the first clear to send signal on the narrow band, and wherein the selected band is based at least in part on whether the at least one distance satisfies a threshold.

27. The method of claim 25, wherein the second clear to send signal is received within a threshold amount of time, and the threshold amount of time is based at least in part on an interframe spacing and a switching time.

28. The method of claim 27, wherein the interframe spacing is down-clocked.

29. The method of claim 26, wherein the information is received within a threshold amount of time, and the threshold amount of time is based at least in part on an interframe spacing and a switching time.

30. The method of claim 29, wherein the interframe spacing is down-clocked.

* * * * *